United States Patent
Basar et al.

(10) Patent No.: US 8,517,268 B2
(45) Date of Patent: Aug. 27, 2013

(54) APPARATUS FOR PREVENTION OF READING OF MAGNETIC CARDS

(75) Inventors: Cihat Celik Basar, Istanbul (TR); Hakan Askeroglu, Istanbul (TR); Ismet Yesil, Istanbul (TR)

(73) Assignees: Kronik Elektrik Elektronik Ve Bilgisayar Sistemleri Sanayi Ticaret Sirketi, Istanbul (TR); TMD Holding B.V., Blaricum (NL)

( * ) Notice: Subject to any disclaimer, the term of this patent is extended or adjusted under 35 U.S.C. 154(b) by 1038 days.

(21) Appl. No.: 11/570,990

(22) PCT Filed: Mar. 8, 2005

(86) PCT No.: PCT/TR2005/000007
§ 371 (c)(1), (2), (4) Date: Oct. 24, 2008

(87) PCT Pub. No.: WO2006/001781
PCT Pub. Date: Jan. 5, 2006

(65) Prior Publication Data
US 2009/0050699 A1   Feb. 26, 2009

(30) Foreign Application Priority Data
Jun. 24, 2004   (TR) .............................. A2004 01513

(51) Int. Cl.
| G06K 19/00 | (2006.01) |
| G06K 19/06 | (2006.01) |
| G06K 5/00 | (2006.01) |
| G06K 7/00 | (2006.01) |
| G06K 7/08 | (2006.01) |

(52) U.S. Cl.
USPC ........... 235/436; 235/435; 235/487; 235/493; 235/380; 235/437; 235/449; 235/438

(58) Field of Classification Search
USPC ................. 235/435, 487, 492, 493, 380, 437, 235/449, 438
See application file for complete search history.

(56) References Cited

U.S. PATENT DOCUMENTS
4,130,242 A * 12/1978 Mannion ....................... 235/450
4,245,902 A *  1/1981 Cataldo et al. ................. 396/502
(Continued)

FOREIGN PATENT DOCUMENTS
| EP | 0411185 | 2/1991 |
| EP | 0790590 | 8/1997 |
(Continued)

OTHER PUBLICATIONS
IBM Technical Disclosure Bulletin (Nov. 1983) vol. 26 No. 6 "Unauthorized Card Stripe Reading Inhibitor".

*Primary Examiner* — Daniel Walsh
(74) *Attorney, Agent, or Firm* — Swanson & Bratschun, L.L.C.

(57) ABSTRACT

A card reading machine includes a card reader for reading data on a magnetic card and a device for preventing reading of the data on the magnetic card by illegal card reading devices operatively associated with the card reading machine. The device for preventing may include an oscillator, a driver circuit and a coil for generating electromagnetic signals similar to data on a card. A method for preventing reading of data on a magnetic card by in illegal card reader in operative association with an apparatus having a card reader intended to read the data on the magnetic card includes producing a signal ruining the data collected by the illegal card reader. The apparatus having a card reader may include an insertion slot in which case the method may further include producing the signal near the insertion slot.

20 Claims, 4 Drawing Sheets

(56) References Cited

U.S. PATENT DOCUMENTS

| | | | |
|---|---|---|---|
| 4,420,751 A | 12/1983 | Paganini | |
| 4,514,623 A | 4/1985 | Baus | |
| 4,644,482 A * | 2/1987 | Juanarena | 702/98 |
| 4,942,464 A | 7/1990 | Milatz | |
| 5,812,762 A * | 9/1998 | Kim | 726/20 |
| 5,955,961 A * | 9/1999 | Wallerstein | 340/5.4 |
| 5,992,740 A | 11/1999 | Zocca | |
| 6,367,695 B1 | 4/2002 | Mair | |
| 6,390,367 B1 | 5/2002 | Doig | |
| 6,422,475 B1 | 7/2002 | May | |
| 6,629,643 B1 * | 10/2003 | Nagata et al. | 235/475 |
| 6,782,739 B2 * | 8/2004 | Ratti et al. | 73/146 |
| 7,004,385 B1 * | 2/2006 | Douglass | 235/379 |
| 7,045,996 B2 | 5/2006 | Lyon et al. | 324/207.16 |
| 7,127,236 B2 * | 10/2006 | Khan et al. | 455/414.1 |
| 7,151,451 B2 * | 12/2006 | Meskens et al. | 340/552 |
| 7,281,656 B2 * | 10/2007 | Nagata et al. | 235/449 |
| 7,317,315 B2 * | 1/2008 | Aizawa et al. | 324/247 |
| 7,377,434 B2 * | 5/2008 | Wakabayashi | 235/449 |
| 7,841,528 B2 * | 11/2010 | Savry et al. | 235/439 |
| 8,397,991 B2 * | 3/2013 | Mueller | 235/450 |
| 2001/0011684 A1 * | 8/2001 | Krause | 235/492 |
| 2002/0053973 A1 * | 5/2002 | Ward, Jr. | 340/506 |
| 2003/0062891 A1 * | 4/2003 | Slates | 324/207.26 |
| 2004/0026507 A1 * | 2/2004 | Nagata et al. | 235/449 |
| 2004/0094628 A1 * | 5/2004 | Yoshii | 235/475 |
| 2004/0200894 A1 * | 10/2004 | Ramachandran et al. | 235/379 |
| 2005/0167495 A1 * | 8/2005 | Morley et al. | 235/449 |
| 2005/0173530 A1 * | 8/2005 | DeLand et al. | 235/449 |
| 2007/0057070 A1 * | 3/2007 | Scarafile et al. | 235/475 |
| 2007/0131768 A1 * | 6/2007 | Wakabayashi | 235/449 |
| 2009/0078761 A1 * | 3/2009 | Sines | 235/380 |
| 2009/0159676 A1 * | 6/2009 | Schliebe et al. | 235/436 |
| 2011/0006112 A1 * | 1/2011 | Mueller | 235/379 |
| 2011/0135092 A1 * | 6/2011 | Lehner | 380/252 |
| 2012/0043379 A1 * | 2/2012 | Ramachandran et al. | 235/379 |

FOREIGN PATENT DOCUMENTS

| | | |
|---|---|---|
| EP | 1043704 | 10/2000 |
| EP | 1394728 | 3/2004 |
| GB | 2351590 | 5/2001 |
| JP | 5999578 | 6/1984 |
| JP | H6262821 | 9/1994 |
| JP | 200167524 | 3/2001 |
| JP | 2003223620 | 8/2003 |

* cited by examiner

APPARATUS FOR PREVENTION OF READING OF MAGNETIC CARDS

TECHNICAL FIELD

This invention is regarding prevention of reading of cards with a magnetic stripe by undesired people.

Some people with bad intentions read the information on the stripes of magnetic cards belonging to clients at automated teller machines (ATM) owned by banks and accessible for utilization by banks' clients by reading them by means of a device (card reader) that they stick in the card insertion slot of an ATM machine and store this information, and afterwards copy this information onto another card and can Access clients' accounts and this process continues until it is noticed or the account is depleted. Our invention has been designed to prevent this situation, and to prevent banks and banks' clients from suffering from a loss.

For this purpose, to prevent the electronic card fastened by sticking in the card insertion slot of an automated teller machine by people with bad intentions from accurately reading and consequently recording, that is, for the purpose of ensuring that the reader makes errors during the reading process, near where this device can possibly be installed, a coil with a ferrite core is placed and signals similar to the data on a card but self-repeating are formed around this coil. As the reader cannot precisely read the data on a card, it will not be able to record, and people with bad intentions will not capture the data on the magnetic card.

DESCRIPTION OF INVENTION

Figure 1:
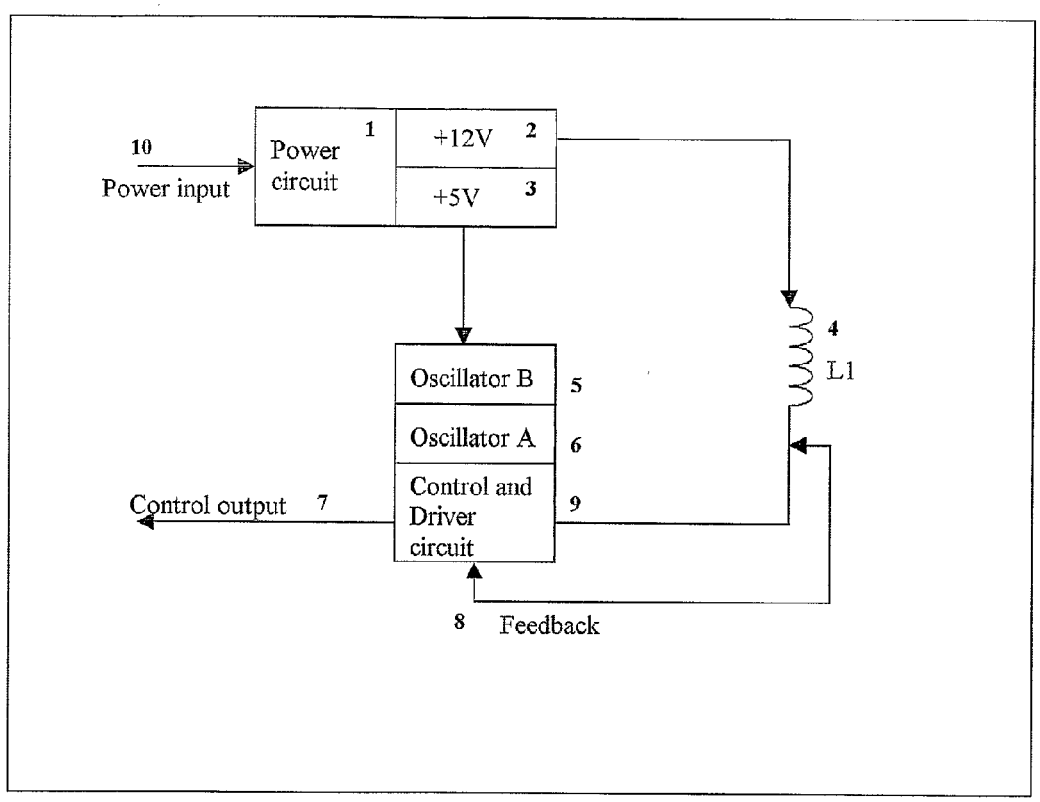
FIG. 1 shows the block diagram of the invention.
Figure 2:
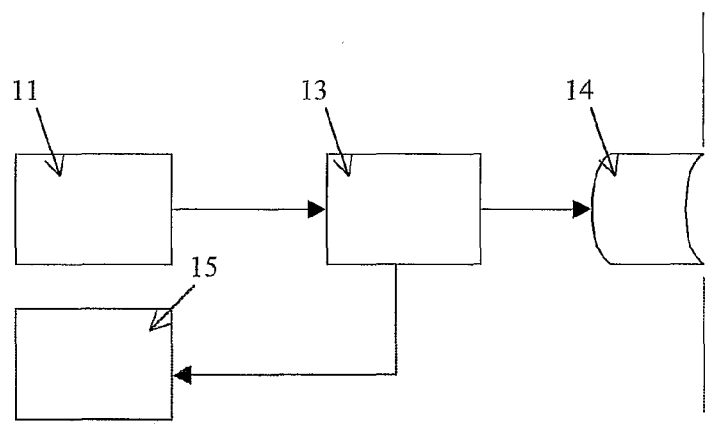
FIG. 2 shows the way that a regular ATM machine operates as a block.
Figure 3:
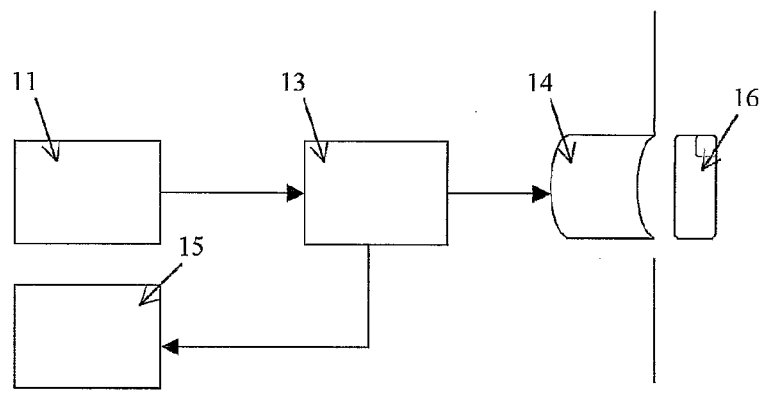
FIG. 3 shows positioning of the illegal copying device.
Figure 4:
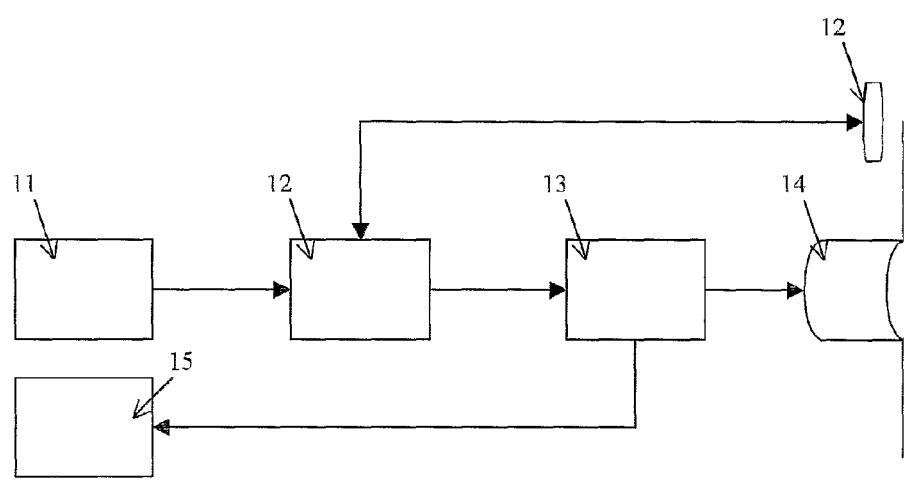
FIG. 4 is the illustration of the way in which the device is connected to an ATM machine.

The purpose of this invention is to prevent reading of cards with a magnetic stripe in the restricted area. For this purpose, the block diagram in FIG. 1 is made.

In order to attain this purpose, it is required that an electromagnetic field be created around an inductive charge (4).

For this electromagnetic field to be created, the electronic circuit made needs to have a power input (10) and this power input should be regulated in line with the required voltage values. +12V (2) and +5V (3) are the regulating circuits. For ruining the data obtained by the card reading device during reading, the electromagnetic field required to be formed needs to be in certain frequencies. This frequency is obtained at oscillator A (6). Conveying frequency is produced at oscillator B (5). It is conveyed to coil L1 (4) over the driver circuit (9) and it spreads from here as electromagnetic wave. If coil L1 (4) is removed from its setting, this is noticed through the feedback (8) path and the control output (7) is positioned as an abnormal situation indicator. The same situation also applies to power input (10). If power input (10) is interrupted for some reason, the power circuit (1) will not operate and the control output (7) will be in abnormal status.

As this device can be utilized anywhere, it is actually designed to be utilized in ATM's. Its connection to ATM's will be described below.

The card reader (13) circuit obtains the power that is needed for it to operate from the power supply (11) unit; and when a card comes to the card insertion slot (14), the card reader (13) unit reads and evaluates the data on this card and communicates them to the computer (15) in the ATM. There are no problems as far as here. The problem will start when another card reader (16) is installed in front of the card insertion slot (14) and on the exterior surface of the ATM device.

As it is required that the card desired to be inserted into the card insertion slot (14) pass through the illegal card reader (16), the data 5 on the card will be read and stored by the illegal card reader (16) also. This is an undesired situation. To prevent this, a coil (17) is placed immediately underneath the card insertion slot (14). The coil's forming an electromagnetic field in the way desired is attained. The process of operating this coil performed by the device (12). The device (12) obtains its power from the ATM power supply (10) (11), and ensures that the card reader unit (13) is also fed. If there is a problem in the coil (17) or the power supply (11), the card reader unit (13) will not operate and as it will not be possible for the card to enter the card insertion slot (14), as the card will not pass through the illegal card reader, no data will be read and it will not be able to perform recording. If there is no problem whatsoever with the power supply or the other elements, in this case, due to the electromagnetic field spread by the coil (17), the illegal card reader will not be able to perform reading and as a result will not be able to record the data on a card that passes through it.

The invention claimed is:

1. A card reading machine comprising:
   a card reader for reading data on a magnetic card; and
   a device for preventing reading of the data on the magnetic card by an illegal card reading devices operatively associated with the card reading machine,
   wherein the device for preventing reading comprises a coil for generating signals when the magnetic card is passed along the illegal card reading device, the signals being so similar in frequency range to signals generated by the magnetic card being passed along the illegal card reading device, that coil generated signals and signals generated by the magnetic card being passed along the illegal card reading device create combined signals from which the coil generated and the passing of the magnetic card generated signals cannot in practice be filtered from each other.

2. The card reading machine of claim 1, wherein the device for preventing reading further comprises an oscillator and a driver circuit, wherein the oscillator, the driver circuit and the coil produce the signals similar in frequency range to signals generated by the magnetic card being passed along the illegal card reading device.

3. The card reading machine of claim 1, further comprising a card insertion slot for receiving the magnetic card in operative association with the card reader, the device preventing reading providing an electromagnetic field combining with the signals generated by the magnetic card being passed along the illegal card reading device operatively associated with the insertion slot.

4. The card reading machine of claim 3, wherein the device preventing reading further comprises an oscillator and a driver circuit.

5. The card reading machine of claim 4, wherein the signals generated by the coil are self-repeating.

6. The card reading machine of claim 4, further comprising a control operatively associated with the coil to indicate an abnormal situation if the coil is removed.

7. The card reading machine of claim 6, further comprising the control indicating an abnormal situation if power to the coil is interrupted.

8. The card reading machine of claim 7, further comprising the control disabling the power circuit.

9. The card reading machine of claim 6, wherein the operative association between the coil and the control is provided by a feedback path.

10. The card reading machine of claim 4, wherein the coil is placed near the insertion slot.

11. The card reading machine of claim 1, wherein the card reading machine is an automated teller machine.

12. The card reading machine of claim 1, wherein the magnetic card comprises a magnetic stripe on the card.

13. A device for preventing reading of data on a magnetic card by an illegal card reading device at a card reading machine, the device comprising means for providing an electromagnetic field ruining the data obtained by the illegal card reader, wherein the means for providing the electromagnetic field comprises a coil for generating signals so similar in frequency range to signals generated by the magnetic card being passed along the illegal card reading device that coil generated signals and signals generated by the magnetic card being passed along the illegal card reading device create combined signals from which the coil generated and the passing of the magnetic card generated signals cannot in practice be filtered from each other.

14. The device of claim 13, wherein the means for providing the electromagnetic field further comprises an oscillator and a driver circuit.

15. The device of claim 14, further comprising a power input, a control and a control output.

16. The device of claim 15, further comprising a feedback path from the coil to the control, wherein the control output is positioned as an abnormal situation indicator if the coil is removed.

17. The device of claim 16, wherein the control output is positioned as an abnormal situation indicator if power to the device is interrupted.

18. A method of preventing reading of data on a magnetic card by an illegal card reader in operative association with an apparatus having a card reader intended to read the data on the magnetic card, the method comprising:

producing a signal ruining the data collected by the illegal card reader, wherein the signal so similar in frequency range to signals generated by the magnetic card being passed along the illegal card reading device that coil generated signals and signals generated by the magnetic card being passed along the illegal card reading device create combined signals from which the coil generated and the passing of the magnetic card generated signals cannot in practice be filtered from each other.

19. The method of claim 18, wherein the apparatus having a card reader intended to read data on a magnetic card comprises an insertion slot for the magnetic card, the method further comprising:

producing the signal near the insertion slot.

20. The method of claim 18, wherein the signal produced is self-repeating.

* * * * *

UNITED STATES PATENT AND TRADEMARK OFFICE
CERTIFICATE OF CORRECTION

PATENT NO. : 8,517,268 B2  
APPLICATION NO. : 11/570990  
DATED : August 27, 2013  
INVENTOR(S) : Cihat Celik Basar, Hakan Askeroglu and Ismet Yesil Page 1 of 1

It is certified that error appears in the above-identified patent and that said Letters Patent is hereby corrected as shown below:

Title Page, item (73), the first Assignee should read,

Kronik Elektrik Elektronik Ve Bilgisayar Sistemleri Sanayi Ticaret Limited Sirketi Signed and Sealed this
Fourth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,517,268 B2                                    Page 1 of 1
APPLICATION NO. : 11/570990
DATED             : August 27, 2013
INVENTOR(S)       : Basar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1745 days.

Signed and Sealed this

Fifteenth Day of September, 2015

Michelle K. Lee
*Director of the United States Patent and Trademark Office*